United States Patent [19]
Howell et al.

[11] Patent Number: 5,102,675
[45] Date of Patent: Apr. 7, 1992

[54] METHOD FOR PRODUCING AND USING OAK IN DIVIDED FORM FOR FLAVORING WINE

[75] Inventors: Gordon S. Howell, Okemos; David P. Miller, Lansing, both of Mich.

[73] Assignee: Board of Trustees operating Michigan State University, East Lansing, Mich.

[21] Appl. No.: 636,201

[22] Filed: Dec. 31, 1990

[51] Int. Cl.$^5$ .............................................. C12H 1/22
[52] U.S. Cl. ........................ 426/422; 426/330.4; 426/592; 217/72; 217/88
[58] Field of Search .................. 426/592, 330.3, 422, 426/330.4; 217/72, 88

[56] References Cited

U.S. PATENT DOCUMENTS

| | | | |
|---|---|---|---|
| 2,132,435 | 6/1934 | Reiman | 426/592 |
| 2,185,206 | 1/1940 | Little | 217/88 |
| 2,347,783 | 5/1941 | Krebs | 426/592 |
| 2,415,431 | 2/1947 | Krebs | 426/592 |
| 2,417,505 | 3/1947 | Krebs | 426/592 |
| 2,807,547 | 9/1957 | Nickol | 426/592 |
| 2,865,770 | 12/1958 | Nickol | 217/72 |
| 3,842,723 | 10/1974 | Boucher | 217/72 |
| 4,350,708 | 9/1982 | De Palacioa | 426/592 |
| 4,576,826 | 3/1986 | Gubiev | 426/592 |
| 4,956,194 | 9/1990 | Gos | 426/592 |

FOREIGN PATENT DOCUMENTS

| | | | |
|---|---|---|---|
| 2498428 | 7/1982 | France | 426/592 |
| 233771 | 9/1988 | Japan | 426/592 |
| 464618 | 12/1975 | U.S.S.R. | 426/592 |
| 630292 | 10/1978 | U.S.S.R. | 426/592 |
| 636257 | 12/1978 | U.S.S.R. | 426/592 |
| 663718 | 5/1979 | U.S.S.R. | 426/592 |
| 897844 | 1/1982 | U.S.S.R. | 426/592 |
| 1033539 | 8/1983 | U.S.S.R. | 426/592 |
| 1291601 | 2/1987 | U.S.S.R. | 426/592 |
| 1472489 | 4/1989 | U.S.S.R. | 426/592 |

OTHER PUBLICATIONS

The American Heritage Dictionary 1982, Houghton Mifflin Co., p. 1260.

*Primary Examiner*—Carolyn Paden
*Attorney, Agent, or Firm*—Ian C. McLeod

[57] ABSTRACT

A method for producing and using oak chips or other divided forms of the oak for aging wine is described. The chips or other divided forms are provided in a permeable container. In particular a method is described for removing undesirable flavors from the oak by soaking the oak in an aqueous solution of water or water and ethanol and toasting the oak to enhance desirable flavors prior to or after the soaking. The method produces wines which are comparable to the best barrel aged wines.

24 Claims, No Drawings

METHOD FOR PRODUCING AND USING OAK IN DIVIDED FORM FOR FLAVORING WINE

BACKGROUND OF THE INVENTION (1) Field of the Invention

The present invention relates to a method for producing and using oak in divided form for flavoring wine. In particular, the present invention relates to a method wherein the oak in the divided form is pretreated to eliminate undesirable flavors and toasted and is then used in the wine over a relatively long period of time to develop the flavor.

(2) Prior Art

White oak is traditionally used to make barrels for aging wine. European white oak (*Q. robur*) is preferred for the flavor which it imparts to the wine. American white oak (*Q. alba*) is judged to be inferior for this purpose. Stainless steel or glass lined tanks have advantages, including lower cost, better protection against oxygen, better space utilization in the cellar and smaller losses from evaporation. The problem is that the tank wines do not taste like the oak barrel-aged wines. Oak barrels are thus often preferred.

Oak possesses xylem rays, and these dense rays of parenchyma tissue serve to make a stave relatively impermeable to liquids when the staves are quarter sawn or split. This causes the interface between liquid and wood to be perpendicular to the direction of the rays. A second property of oak that makes it attractive for storing liquids is the presence of tyloses in the xylem tissue. Tyloses are gum materials which plug the vessels, keeping them impermeable to wine or spirits. Wood that does not contain tyloses and xylem rays is unacceptable for cooperage. The third property of oak that makes it attractive for wine and spirit storage is the array of flavors imparted to the wine or spirits stored in it. The flavor components of oak are derived from phenolic acids, aromatic aldehydes, and possibly from small amounts of lactones and furfurals. Woods that possess the necessary physical attributes for tight cooperage such as beech, redwood, and cedar have been tried but none have met with the success of oak, primarily because of these flavor contributions, but could be used if the required flavor could be introduced.

When wines are aged in oak, they extract the flavoring constituents from the barrel. A second phenomenon that occurs during barrel aging is the evaporation of water and ethanol through the barrel staves. Depending on humidity conditions in the cellar, water may be lost to a greater or lesser extent than ethanol. The balance point between the two is 60 to 65% relative humidity. Above this, ethanol is lost at a greater rate and will decrease in the wine. Below this, water is lost at a greater rate and will cause the ethanol content to increase. The net loss of ethanol and water tends to concentrate the higher molecular weight volatiles since these are not lost as readily through the staves. Evaporative losses through a barrel are approximately 2 to 5% of the volume per year.

A third aspect of barrel aging of wine is the oxidation of the wine that occurs in the barrel. Aging of wine involves a slow oxidative change of the many constituents present. Barrel aging is unique in that it allows for introduction of oxygen into the wine. Many people harbor the erroneous belief that oxygen penetrates the staves and allows for further oxidation of the wine. However, Peterson (Peterson, R. G., Formation of reduced pressure in barrels during aging. Am. J. Enol. Vitic. 27:80-81 (1976)) demonstrated that as water and ethanol evaporate from the barrel, ullage (or a vacuum) develops. If oxygen were penetrating the barrel it would relieve this vacuum. It is more likely that oxygen is introduced when the barrels are topped or racked since these are standard practices for barrel aged wines.

The flavoring constituents extracted from oak are composed principally of non-flavonoid phenolic acids (gallic, gentisic, protocatechuic, p-hydroxybenzoic, p-coumaric, ferulic, sinapic and vanillic) and aromatic aldehydes (syringaldehyde, sinapaldehyde, vanillin, coniferaldehyde, propoiovanillone, acetosyringone) and smaller amounts of lactones and furfurals (Litchev, V. Am. J. Enol. Vitic. 40(1)31-35, (1989); Puech, J. L., Am. J. Enol. Vitic. 32(2) 111-14 (1981); and Puech, J. L., Am. J. Enol. Vitic. 38(3) 236-38 (1987). The relative quantities of the various components vary with the species of oak, the site on which the trees of a particular species were grown and differences within the tree itself. The species effect is under genetic control and is responsible for the largest differences found between one type of oak and another with the European white oak (*Q. robur* and *Q. sessilis*) containing larger amounts of phenolic compounds, than the American white oak (*Q. alba*). However, the site at which a tree is grown can exert subtle influences on the flavor makeup of the wood since it is the mesoclimate of the site that determines the relative amounts of spring and summer wood. Since spring wood is more porous than summer wood, trees growing on cooler sites have less dense wood since the ratio of spring to summer wood is high. Conversely, trees grown in warmer regions have wood of higher density since the ratio of spring to summer wood is high. This is a great simplification since things like rainfall and soil also play a role but it is generally true (Singleton, V. L., Some aspects of the wooden container as a factor in wine maturation). Less dense wood then, would allow a wine to penetrate the staves and extract the flavor components more quickly.

Once wine is placed in contact with the wood, the phenols are readily extracted. Rous (Rous, C. and B. Alderson. Am. J. Enol. Vitic. 34(4) 211-15 (1983)) showed that first and second fill barrels of both *Q. alba* and *Q. robur* yielded phenols to the wine by diffusion. However, after the most easily extracted phenols were removed, the kinetics of extraction were more linear, suggesting hydrolysis kinetics with bound phenols making up the bulk of those extracted. Each subsequent fill of the barrels showed slower phenol uptake than the previous fill. This is intuitively what one would expect and explains quantitatively why each successive barrel filling must remain longer to get the desired effect on wine quality.

While the species effect on phenol and aromatic aldehyde content is in many cases significant, various researchers have disagreed as to the implications of this on wine quality. Aiken and Noble (Aiken, J. W., et al., Am. J. Enol. Vitic. 35(4) 196-99 (1984); and Aiken, J. W., et al., Vitis 23:27-36 (1984)) aged Cabernet Sauvignon in American and French Oak barrels coopered by the same methods. A panel of tasters were able to detect a difference between the wines stored in the two barrel types after 115 days of aging. However, the same panel was not able to detect differences between barrels when the wines were compared after 239 and 338 days of aging. Rous and Alderson (Rous, C., et al., Am. J. Enol.

Vitic. 34(4) 211-15 (1983)) aged Sauvignon blanc and a white blend in French and American oak barrels and found significant differences between the wines aged in the different barrel types. Their barrels were also coopered by the same methods. The American oak was from Missouri and the French wood was from the Nevers Forest as in the previous study but the wines were aged for a maximum of 175 days. This raises some interesting questions. First, there is a question whether the difference between barrels is only noticeable in wines stored in barrels for relatively short periods of time, or are wood flavor differences more easily masked by red wine. Second, the barrels used in the two studies were coopered by different firms. Since toast levels are subjective, a light toast to one firm may be a medium or heavy toast to another. It is possible that cooperage technique has the most important influence on the properties of the barrel as suggested by Aiken and Noble. This seems unlikely since other work has clearly shown the differences in structure and chemistry of the different species (Puech, J. L., Am. J. Enol. Vitic. 32(2) 111-14 (1981); Rous, C. and B. Alderson., Am. J. Enol. Vitic. 34(4) 211-15 (1983); Singleton, V. L., et al., Am. J. Enol. Vitic. 22: 161-6 (1971); and Singleton, V. L., Some aspects of the wooden container as a factor in wine maturation. In: Chemistry of Winemaking (A. D. Webb ed.). Am. Chem. Soc., Washington, D. C., pp. 254-77 (1974)). However, Litchev (Litchev, V. Influence of Oxidation process on the development of the taste and flavor of wine distillates. Am. J Enol. Vitic. 40(1)31-35 (1989)) showed that toasting of oak at 200° C. increased the aromatic aldehyde content from 12 to 60 times depending on the compound being evaluated. They proposed that lignin was degraded to aromatics by toasting and that lignin was released from its complexed form by toasting and made more available for ethanolysis. Lignin ethanolysis produces a further increase in released aromatics. After the extractable flavor components of oak (i.e. phenolic acids and aromatic aldehydes) are in solution, they are subjected to conversion via oxidation and esterification to produce a wide range of compounds. These reactions occur over a long period of time (4 years in this study) which helped explain why oak flavors soften over time in the bottle. So, while species determines the absolute amount of various flavors available for extraction, cooperage technology influences the rate and portion of the total which is available for flavoring the wine.

If one were attempting to maximize the amount of vanillin in a wine, the best way to achieve this would be to use a heavily toasted barrel and allow the wine to stay in the barrel for as long as possible up to about a year since this would allow for the ethanolysis of lignin. The time frame used to allow ethanolysis was 6 months in the Litchev work (Litchev, V., Am. J. Enol. Vitic. 40(1)31-35, (1989)). Researchers have also shown the products of ethanolysis increase over a long period of time (Puech, J. L., Am. J. Enol. Vitic. 32(2) 111-14 (1981); and Puech, J. L., Am. J. Enol. Vitic. 38(3) 236-38 (1987)). After longer aging periods, the products of ethanolysis may play an increasing role in the wines flavor and may serve to obscure the differences in the phenolics. The differences are reduced further over time as oxidation and esterification change the components in the wine. Further, after the first couple of uses of the barrel, the easily extracted phenols are removed so the proportion of lignin ethanolysis products to phenols may be greater in wines from third-use barrels and differences more difficult to detect.

Since oak cooperage is expensive to purchase and maintain, only the wines that have the greatest potential are typically aged in barrels. It has been suggested that oak chips could be used to introduce some of the desirable oak flavors into wines of lesser value (Singleton, V. L., et al., Am. J. Enol. Vitic. 12: 152-8 (1961); Singleton, V. L., et al., Am. J. Enol. Vitic. 22: 161-6 (1971); and Wilker, K. L. and J. F. Gallander., Am. J. Enol. Vitic. 39(1) 38-43 (1988)). This has met with some success but has its limitations. Extracts made from chips are of new chips which introduces large amount of the phenols. Since the chips are typically extracted for relatively short periods of time (4 to 7 days) there is little time for lignin ethanolysis. Consequently there is a large ratio of phenols to aromatic aldehydes. Further, the chips are rarely toasted thereby reducing the aromatic aldehydes available. Finally, using oak chips to flavor a wine does not introduce oxygen into the wine or allow for the concentration of high molecular weight volatiles as would be the case when barrel aging. Using oak chips in barrels that no longer impart flavors to wine would be one way around this and it also allows for the continued use of old barrels (Wilker, K. L., et al., Am. J. Enol. Vitic. 39(1)38-43 (1988)). However, there still remains the question of how the chips should be handled.

The current prescribed method of using oak chips calls for: (1) a 2-day extraction of the chips with wine to produce a concentrated extract; 2) then add a portion of the extract to a large batch of wine. In a recent study, Wilker and Gallander, Am. J. Enol Vitic. 39(1) 38-43 (1988) reported results of a 14-day addition of raw chips into a used wine barrel compared to wine stored in a new barrel. The results were a difference in taste of the wines over oak barrels. The introduction of chips for a short period of time into the wine has also been suggested. In this instance, the vanillins and precursors are not taken from the chips since this requires ethanolysis of the lignin which takes several months.

To date, those working with oak chips have suggested making ethanol and water extracts of said chips and then adding the resulting extract to the wine in order to give the wine "artificial barrel aging". The amount of extract added was determined by conducting laboratory trials in which increasing amounts of extract were added to the wine until the desired flavor was reached. Several difficulties have been found with this approach. First, by making an extract over the course of only a few days, one produces an extract containing many of the undesirable flavors associated with oak and only a portion of those flavors which are desired. This combination is then added to the wine.

A way was needed to introduce the divided wood into the wine so it could remain there for extended periods but not interfere with winery operations. This would give wineries an inexpensive means for adding the complexity in flavor associated with barrel aging without incurring the huge cost of purchasing new cooperage. Currently, barrels constructed using French-grown oak sell for $525 per 223 liter barrel. These barrels, on the average, will impart oak flavor to wines for about six years with the amount of flavor greatly diminished the last two years.

OBJECTS

It is therefore an object of the present invention to provide a method for producing oak in divided form for producing an aged wine having a flavor at least comparable to the flavor of wine aged in a barrel. Further, it is an object of the present invention to provide a method which is simple and economical. These and other objects will become increasingly apparent by reference to the following description.

GENERAL DESCRIPTION

The present invention relates to a method for producing oak in divided form suitable for aging wine soaked in the oak which comprises the steps of: soaking oak in divided form soaked in an aqueous solution selected from the group consisting of water and water and ethanol so as to eliminate negative flavor components which are undesirable in wine; and toasting the oak in divided form to produce toasted oak which has positive flavor components suitable for aging wine before or after the soaking.

Further the present invention relates to a method for aging wine using oak in divided form in a container for the wine which comprises the steps of introducing toasted oak in a divided form into an immature wine in an amount between about 0.5 to 8 grams per liter for white wine and 0.5 to 12 grams per liter for red wine; and soaking the wine in the oak for a period of at least about 3 months to produce an aged wine.

The method of the present invention involves the extraction of phenolic acids and aldehydes from oak wood in divided form and toasting. It is unique in that the process maximizes the production of desirable aldehydes (coniferaldehyde, syringaldehyde, sinapaldehyde and vanillin) and reduces undesirable flavors (lactones) especially flavors from *Q. alba*.

A larger proportion of the desired flavors is obtained if the divided wood is placed directly in the wine. If the chips are prepared properly before adding to the wine, (i.e. treated in a way to remove undesirable flavors while retaining those which are desired) then, by leaving the chips in the wine for several months, ethanolysis of lignins can occur more fully.

*Q. alba* particularly yields flavors that are important in the production of Bourbon but are not as desirable in wine. Some of these flavors come from the chips by soaking the chips in solutions of varying alcohol concentrations for varying lengths of time. The results indicate that the "bourbon" flavor component is soluble in alcohol. However, the desirable flavors that we wished to retain are also soluble in alcohol. The goal then was to find that point in time where as much "bourbon" character as possible has been removed while retaining the maximum quantity of desirable flavors. Similarly, chips of *Q. robur* yielded some "off" flavors. These are eliminated by soaking in water which is a less effective solubilizing agent.

The present invention preferably uses one leg of a nylon stocking to contain chips, although other suitable perforated containers can be used. These containers are introduced into the wine.

Thus, in the present invention the following treatments were used:

1) Toasting—This has been shown to increase the amount of vanillin and vanillin precursors in the wine. These are among the most desirable flavor contributions of oak;

2) Extraction of Lactones—In freshly dried oak, there are abundant quantities of flavor components produced by lactones. These are the flavors which are of primary importance in aging bourbon whiskey, and are deemed unrefined in most wines. A soak with hot water or ethanol and water prior to or after drying and toasting eliminates the majority of these components. This extraction can be done before or after toasting.

3) Long-term Contact—This involves leaving the treated chips in contact with the wine for periods in excess of 3-months, preferably 6 months, rather than the 2-day or 14-day periods presently suggested. This step is very important. The added exposure time allows the process of lignin ethanolysis to occur and produce an additional efflux of desirable flavor components. This long-term exposure is more akin to the situation which occurs in normal barrel aging. The desirable aspect of this invention, however, is that the chips can be used in either old, completely extracted barrels, or in tanks.

4) Chip Blending—There are at least five different forests in France from which "unique" barrels are produced. Locale of origin is an important factor in flavor contribution. Tasters can distinguish between oak grown in different forests in the same region. These forests are less than 100 miles apart. The use of chips allows for blending of different oak sources and species to produce special "designer" blends of oak. These may be "designed" to produce a proprietal flavor "signature", or they may be custom designed to compliment a specific wine or vintage. Since barrels are not necessary, the choice of wood materials which can be used is now opened beyond oak and might include exotic species for their unique flavor components as a part of the blend.

5) Delivery System—The ease of use and the flexibility to add fresh oak with each new batch of wine, or to add more oak in divided form to a current batch provides great managerial flexibility. A length of a leg of woven nylon stocking that can be filled with a coarse sized chip and placed into the used barrel or tank. This containment approach means that the chips pose no pump or other equipment problems. Alternatively, the oak may be introduced into the wine as a fine powder or other divided form. This process works well for large operations possessing a diatomaceous earth filter. Unit weights of oak in divided form per gallon of wine can be easily regulated.

SPECIFIC DESCRIPTION

The following is an Example of the method of the present invention.

EXAMPLE 1

Chip Preparation

Wood of Oak (*Quercus* sp. *L.*) was obtained from several sources. Michigan grown *Quercus alba L.* (American White Oak) and *Q. robur L.* (European White Oak) were obtained from the Kellogg and Russ Forest research stations at Michigan State University. European grown *Q. robur* was obtained from Demptos Cooperage, Napa, Calif. The Michigan grown oaks were cut longitudinally to yield planks about 2 inches thick and four feet long. These were first kiln dried then separated into heartwood and sapwood. Since only heartwood is used in tight cooperage, this was used. The European grown oak had been previously divided into heartwood and sapwood and dried for barrel production so these steps were bypassed.

After drying, the wood was cut into 4" square blocks was passed through a hammermill with chains and cutting head to obtain chips. These ranged in size from 0.1 to 4 mm in width, 0.1 to 4 mm in thickness, and 0.1 to 4 cm in length. The average size was about $1 \times 2 \times 5$ mm. The chips were stored in sealed polyethylene bags at $-5°$ C. until used.

Toasting:

In order to increase the desirable levels of flavor components in the chips, they were toasted at 200° C. for periods ranging from 20 minutes to 1 hour. Temperatures between 100° C. and 200° C. should also give good results. Above 200° C., the wood begins to char which is undesirable.

Soaking:

After toasting, chips of *Q. alba* were soaked in solutions containing from 5 to 10% ethanol for periods of from one to four days in order to remove flavors associated with bourbon. The chips were soaked in sufficient solution to cover them in a small container (about 4 liters/kg of chips). Preferably chips are soaked before toasting which seems to yield even better results. The 5% ethanol concentration appears to be sufficient to remove the undesirable flavors from the wood.

Chips of *Q. robur* exhibited a different set of undesirable flavors. These were described as having an odor of wet paper. These chips were soaked, under constant agitation, in 40° C. water for 24 to 48 hours to remove these components. It appears that the undesirable flavors in *Q. robur* are water soluble and that this treatment was adequate in reducing or eliminating these components. Water was used in a volume similar to that used in soaking the *Q. alba* chips (i.e. about 4 liters/kg chips).

Quantity of Chips:

From 0.5 to 12 grams of Oak per liter of wine were used. This amount was based on work by Singleton (Singleton, V. L., Some aspects of the wooden container as a factor in wine maturation. pp. 254-77, In: Chemistry of Winemaking (A. D. Webb ed.). Am. Chem. Soc., Washington D. C. (1974); and Singleton, V. L., Using Wooden Cooperage in the Winery Today. pp. 38-47, In: Proceedings of the Seventh Training Conference on Fundamentals of Table Wine Processing (G. M. Cooke ed.). University Extension, Univ. Calif., Davis, Calif. (1981)) which indicated a detectable flavor difference in wine after the addition of about 500 mg of oak per liter of wine. This has been found to adequately cover the desirable contribution of flavor from oak to wines. Generally, red wines are able to assimilate more oak flavor than white wines since they are more strongly flavored before oak is added. Preferably the finely divided oak is used in an amount of 0.5 to 8 grams per liter of the white wine and 0.5 to 12 grams per liter for red wine.

Method of Containing Chips:

In order to keep chips from fouling pumping equipment and hoses, it was necessary to devise a means for containing them. This was accomplished by first preparing the chips and then inserting them into elastic nylon retaining sleeves (ENRS a leg of nylon stocking). In the example, 279 gms of oak were added to each ENRS for the treatment of white wine and 390 gms were added for the treatment of red wine. This worked out to 1.25 and 1.75 gms respectively, of oak per liter of wine in a 223 liter barrel. By using this approach, it was possible to increase the amount of oak incrementally. The empty ENRS were leached in a 55% ethanol solution prior to their use to insure they would impart no flavors to the wine.

Discussion:

Two considerations exist when introducing oak chips into tanks of wine. One, the amount of oak added to the wine must be very carefully controlled. If too much oak is added at the outset, the only recourse one has is to blend the oaked wine with one which has not been oaked in order to reduce the intensity of the flavors from the wood. Secondly, it is important in most wineries to have the chips in some kind of containment vessel so they do not interfere with operations where wine is pumped from one tank to another. We solved both of these problems with one device (i.e. the ENRS). The ENRS was used initially with good success in plastic barrels but with less success in spent, wooden barrels. This was due to the relatively small opening in wooden barrels and, to the tendency of the chips to swell once they had been in the wine. These factors acted in concert to make the ENRS' removal difficult. Various devices which contain the chips but are better able to maintain their shape and at the same time allow free movement of the wine to the chips can be used.

By using containment devices such as the ENRS, an amount of oak can be added to the containment device that will impart a known quantity of oak per unit volume wine in any size storage vessel. In the current work we used oak rates of 1.25 and 1.75 gms/liter of wine/ENRS. After examining the results, it appears that a commercially acceptable approach would be to offer various sizes of ENRS. In this way a winemaker could choose to begin by adding 1 ENRS which contained 1.25 gms/liter of wine for example, and then increase this by adding a second ENRS containing 0.25 gms/liter for the size container in which the wine was stored. If some of the containment devices are made with relatively small increments of oak for a given size storage vessel (say 0.25 to 0.50 gms/L, the winemaker has very fine control over the amount of oak added.

This invention is an improvement over currently available means such as using staves of wood for supplying oak in a large tank since it allows the wine maker to have such fine control over the level of oak flavoring. In the prior system, large pieces of oak are fixed into a tank and which are meant to flavor several batches of wine before they are replaced. This system imparts a large amount of flavor quickly to the first wine stored in that tank with each subsequent batch receiving oak more slowly until the oak source is spent. If this is done in a spent oak barrel, the first wine does not have sufficient time to age since it is acquiring oak too quickly and the later wines do not acquire oak flavor as quickly as is necessary to move the wine out of the winery and into the marketplace. The present invention allows the winemaker to add any amount of oak then leave the wine in the barrel for as long as desired.

A second benefit of the present invention is that various types of oak can be blended for a specific wine. Once that wine has been aged sufficiently, it can be removed from the tank with the chips, another batch of wine added, and a new, totally different blend of oak added for the second batch. The chips for each wine batch can be handled independently of any other batch. Toast levels and chip blends can be altered to give an infinite variety of possibilities.

Particle size is an important factor in using chips. Since small particles have a greater surface area, they are extracted more quickly. It appears that the particle size will interact with the toasting treatments to yield more of the desired flavors from small chips. Secondly, the effect of various temperature levels on the flavor components of the various oaks can be controlled. Toasting treatments can be between temperatures between 70° and 220° C., preferably between 180° and 200° C. for 40 to 120 minutes.

The method of the present invention has several unique features: 1) the method of introducing the oak into the wine using the container for the chips; 2) the careful preparation of the chips to remove unwanted flavors and increase desirable flavors is new to chips; 3) the flexibility of the method is unprecedented in todays wine industry.

Also, the present invention provides a means for improving wine flavor and quality using oak in divided form as an alternative to barrels which are expensive and difficult to maintain. The quantity of flavor addition can be adjusted. Blending of oaks from different sources is possible and can easily be accomplished. French oak barrels cost several hundred U.S. dollars per 50 gallon unit. The present invention provides the same results at 1/10 the cost. Varying water extraction, drying and toasting treatments influences a reduction in lactones (bad flavors) and an increase in phenolic aldehydes (good flavors, particularly vanillin, coniferaldehyde, syringaldehyde, sinapaldehyde). The treated oak in divided form provides an inexpensive alternative to expensive barrels for wineries to enhance their wine flavors with oak and also maintain a high degree of control over the quantity of the flavors added.

It is intended that the foregoing description be only illustrative of the present invention and that the invention be limited only by the hereinafter appended claims.

We claim:

1. A method for producing toasted oak in divided form suitable for aging wine soaked in the toasted oak which comprises the steps of:
   (a) soaking dried oak in divided form in an aqueous solution selected from the group consisting of water and a solution of water and ethanol under conditions sufficient to eliminate negative flavor components in the oak which are undesirable in wine; and then
   (b) toasting the oak in divided form to produce toasted oak which has positive flavor components suitable for aging wine.

2. The method of claim 1 wherein the oak is soaked in the solution for between about 24 and 36 hours.

3. The method of claim 1 wherein the oak is toasted for between about 40 and 120 minutes at a temperature between about 70° C. to 200° C.

4. The method of claim 1 wherein the oak is toasted for between about 40 and 120 minutes at 70° C. to 200° C. and wherein the oak is soaked in the solution for between about 24 and 36 hours.

5. The method of claim 4 wherein the oak has an average particle size of about 1×2×5 mm.

6. The method of claim 1 wherein the toasted oak is from multiple selected forests known to be suitable for aging wine.

7. The method of claim 1 wherein the oak has an average particle size of about 1×2×5 mm or less.

8. The method of claim 1 wherein the oak is American white oak and is soaked in the aqueous solution containing between about 1 and 10 percent ethanol for less than 4 days.

9. The method of claim 8 wherein the soaking is at a temperature between about 15° C. and 30° C. for less than about 36 hours.

10. The method of claim 1 wherein the toasting is at a temperature between about 180° C. to 200° C. for less than about 120 minutes.

11. The method of claim 1 wherein the oak is European Oak which is soaked in water, as the solution.

12. A method for aging wine using oak in divided form in a container for the wine which comprises the steps of:
   (a) introducing toasted oak in a divided form into an immature wine in an amount between about 0.5 to 8 grams per liter for white wine and 0.5 to 12 grams per liter for red wine wherein oak for the toasted oak has been prepared from dried oak, then soaked in water or a solution of water and ethanol to remove negative flavor components in the oak which are undesirable in wine and then toasted; and
   (b) soaking the wine in the oak for a period of at least about 3 months to produce an aged wine.

13. The method of claim 12 wherein the oak is soaked in an aqueous solution selected from the group consisting of water and water and ethanol for between about 24 and 36 hours.

14. The method of claim 12 wherein the oak is toasted for between about 45 and 120 minutes at a temperature between about 70° C. and 200° C.

15. The method of claim 12 wherein the oak is toasted for between about 45 and 120 minutes at a temperature between about 70° C. to 200° C. and wherein the oak is soaked in the solution for between about 24 and 36 hours.

16. The method of claim 15 wherein the oak has an average size of between about 1×2×5 mm.

17. The method of claim 12 wherein the toasted oak is from multiple selected forests known to produce raw oak suitable for aging wine.

18. The method of claim 12 wherein the toasted oak has an average particle size of between about 1×2×5 mm.

19. The method of claim 12 wherein the wine is aged for between about 3 and 6 months in the toasted oak.

20. The method of claim 12 wherein the oak is provided in a separate container in the wine.

21. The method of claim 12 wherein the oak is American white oak which is toasted and the toasted oak is soaked in an aqueous solution containing between about 1 and 10 percent ethanol for less than about 4 days.

22. The method of claim 12 wherein the water and ethanol are used as the solution for the soaking at a temperature between about 15° C. and 30° C. for less than about 36 hours.

23. The method of claim 12 wherein the toasted oak has been toasted at a temperature between about 180° C. to 200° C. for less than about 120 minutes.

24. The method of claim 12 wherein the oak is soaked in water.

* * * * *